United States Patent
Shattah et al.

(10) Patent No.: US 8,650,209 B1
(45) Date of Patent: Feb. 11, 2014

(54) SYSTEM, METHOD, AND COMPUTER PROGRAM FOR DETERMINING MOST OF THE NON DUPLICATE RECORDS IN HIGH PERFORMANCE ENVIRONMENTS IN AN ECONOMICAL AND FAULT-TOLERANT MANNER

(75) Inventors: Guy Shattah, Tel Aviv (IL); Michael Binshtock, Tel Aviv (IL)

(73) Assignee: Amdocs Software Systems Limited, Dublin 3 (IE)

( * ) Notice: Subject to any disclaimer, the term of this patent is extended or adjusted under 35 U.S.C. 154(b) by 72 days.

(21) Appl. No.: 12/913,720

(22) Filed: Oct. 27, 2010

(51) Int. Cl.
*G06F 17/30* (2006.01)

(52) U.S. Cl.
USPC .......................................................... 707/770

(58) Field of Classification Search
None
See application file for complete search history.

(56) References Cited

U.S. PATENT DOCUMENTS

| | | | |
|---|---|---|---|
| 6,295,541 B1 * | 9/2001 | Bodnar et al. | 707/3 |
| 6,374,241 B1 * | 4/2002 | Lamburt et al. | 707/1 |
| 6,397,228 B1 * | 5/2002 | Lamburt et al. | 707/692 |
| 6,457,006 B1 * | 9/2002 | Gruenwald | 707/7 |
| 7,007,041 B2 * | 2/2006 | Multer et al. | 707/2 |
| 7,039,764 B1 | 5/2006 | Shetty et al. | |
| 7,370,057 B2 * | 5/2008 | Burdick et al. | 707/692 |
| 7,562,102 B1 * | 7/2009 | Sumner et al. | 707/201 |
| 7,698,322 B1 * | 4/2010 | Langley | 707/692 |
| 8,055,633 B2 * | 11/2011 | Whyte | 707/692 |
| 2002/0174109 A1 | 11/2002 | Chandy et al. | |
| 2004/0062267 A1 | 4/2004 | Minami et al. | |
| 2005/0055380 A1 | 3/2005 | Thompson et al. | |
| 2007/0255682 A1 | 11/2007 | Brelsford et al. | |
| 2007/0283287 A1 * | 12/2007 | Taylor et al. | 715/769 |
| 2009/0225676 A1 * | 9/2009 | Kisela et al. | 370/252 |

\* cited by examiner

*Primary Examiner* — Dinku Gebresenbet
(74) *Attorney, Agent, or Firm* — Zilka-Kotab, PC

(57) ABSTRACT

A system, method, and computer program product are provided for determining at least potentially duplicate records. In use, when a new record is received, a first entry of a first predetermined field of the newly received record is identified, and a data structure is selected, based on the first entry. Further, a second entry of a second predetermined field of the newly received record is identified, and the second entry is compared to entries already stored in the data structure, where the entries stored in the data structure are associated with a plurality of other received records. Still yet, it is determined whether the newly received record is at least potentially a duplicate of at least one of the other received records, based on the comparison.

14 Claims, 7 Drawing Sheets

| TYPE | VALUE |
|---|---|
| 0 | PD 10 |
| 1 | 8:00:01 |
| 1 | 5:30:10 |
| 1 | 1:30:01 |
| 0 | PD 5 |
| 1 | 3:00:01 |
| 1 | 2:10:02 |
| 1 | 1:32:17 |
| ... | ... |
| ... | ... |

FIGURE 6

| TYPE | VALUE |
|---|---|
| 000 | DATA 1-1 |
| 000 | DATA 1-2 |
| 000 | DATA 1-3 |
| 001 | SUB-HEADER-1-1 |
| 001 | SUB-HEADER-1-2 |
| 010 | data-1 |
| 010 | data-2 |
|  |  |
|  | ... |
|  | ... |

FIGURE 7

SYSTEM, METHOD, AND COMPUTER PROGRAM FOR DETERMINING MOST OF THE NON DUPLICATE RECORDS IN HIGH PERFORMANCE ENVIRONMENTS IN AN ECONOMICAL AND FAULT-TOLERANT MANNER

FIELD OF THE INVENTION

The present invention relates to data records, and more particularly to duplicate data records.

BACKGROUND

In many cases it is desired to identify duplicate records. For example, an incoming stream of records to be stored in a database may contain duplicates. Duplicate records are generally desired to be identified such that the duplicates may be treated in a different manner (e.g. by either ignoring them or taking the duplication into account). Unfortunately, conventional techniques for identifying duplicate records have exhibited various limitations.

For example, a standard check for duplication is to try an INSERT operation into a database table that keeps a key of the fields unique per entry, and check the SQL result. However, this operation requires numerous input/output operations, and slows the system performing such operations considerably. Moreover, the INSERT operation is typically done as part of a roundtrip of the event in which the records are stored in the database, before a response is sent, and thus adds to the latency of the event (e.g. which causes an issue in real-time considerations).

In another example involving a real time environment, it is crucial to keep data available in a computer memory, as long as a computer program is running, while making sure that interrupted execution of a computer program does not break data consistency. Many existing solutions handle this issue by keeping a recovery log, including a list of past actions executed prior to stabilizing the data structure. Unfortunately, this takes overhead in terms of both time and space.

Moreover, in computer handling there are a huge amount of transactions, each involving a record, where large amounts of memory are used to store data such as the key of the record (for various reasons, including duplicate checking) or/and timestamp. There is a need to utilize the computer memory in an efficient and economical manner.

There is thus a need for addressing these and/or other issues associated with the prior art.

SUMMARY

A system, method, and computer program product are provided for determining most of the non-duplicate records. In use, a new record is received. Additionally, a first entry of a first predetermined field of the newly received record is identified, and a data structure is selected, based on the first entry. Further, a second entry of a second predetermined field of the newly received record is identified, and the second entry is compared to entries already stored in the data structure, where the entries stored in the data structure are associated with a plurality of different previously received records. The second field may have a monotonic component, such as a timestamp, so it can be sorted, allowing also highest/lowest/latest and relevant ones to be stored in computer memory. Still yet, it is determined whether the record is at least potentially a duplicate of at least one of previously received records, based on the comparison.

A system, method, and computer program product are provided for storing a first entry of a first predetermined field into a data structure that is used in to store data such as the key of a record (for various reasons, including duplicate checking) or/and timestamp. Data is stored in a data structure which is both economical and fault-tolerant, making sure that interrupted execution of the program does not invalidate the data structure. The entry of the first field is stored in a way which utilizes less memory than its 'registered' full size.

BRIEF DESCRIPTION OF THE DRAWINGS

FIG. 6 illustrates a data structure storing entries associated with records, in accordance with still yet another embodiment.

FIG. 7 illustrates a flattened hierarchical data structure storing entries associated with records, in accordance with another embodiment.

DETAILED DESCRIPTION

Figure 1:
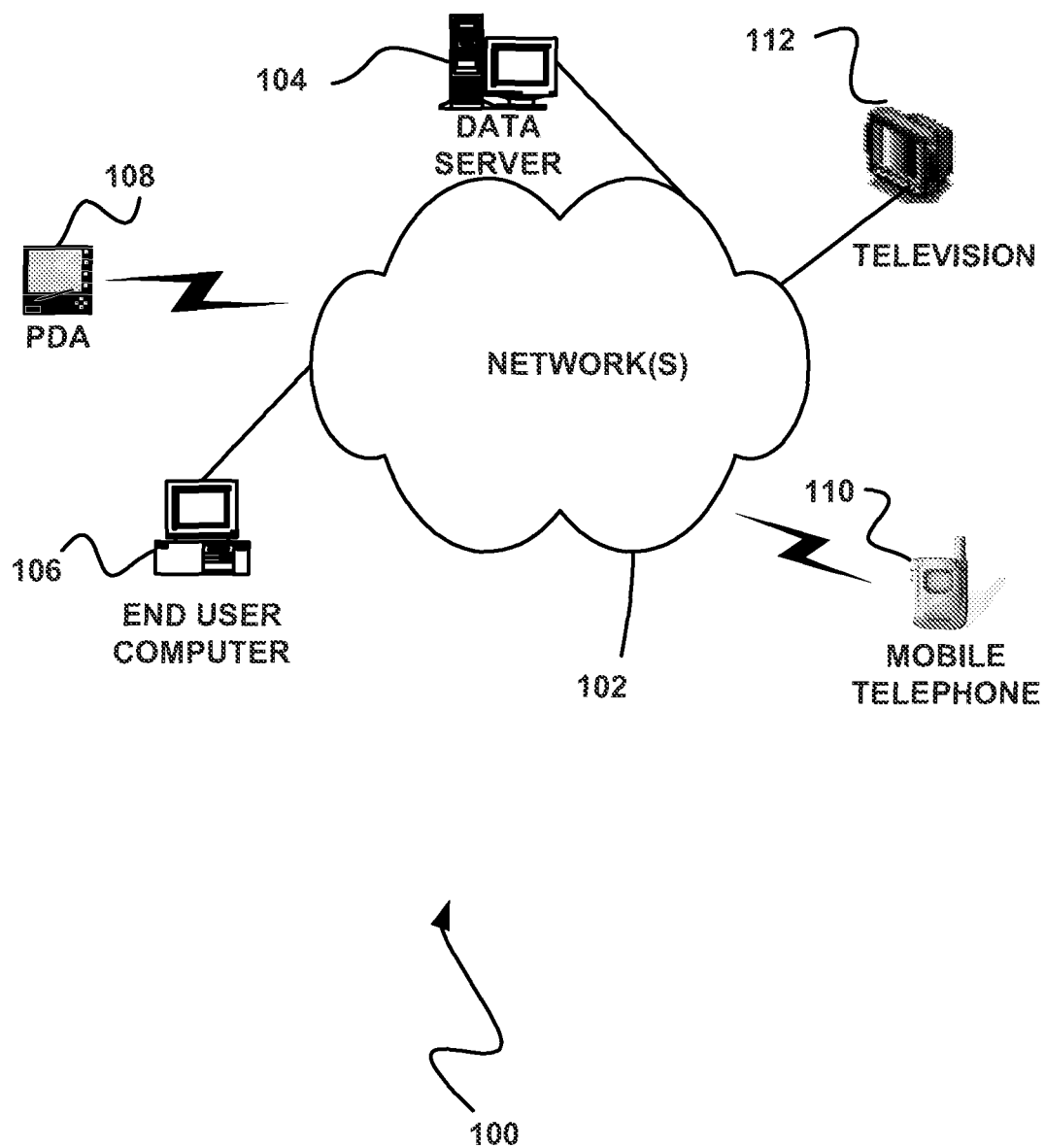
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
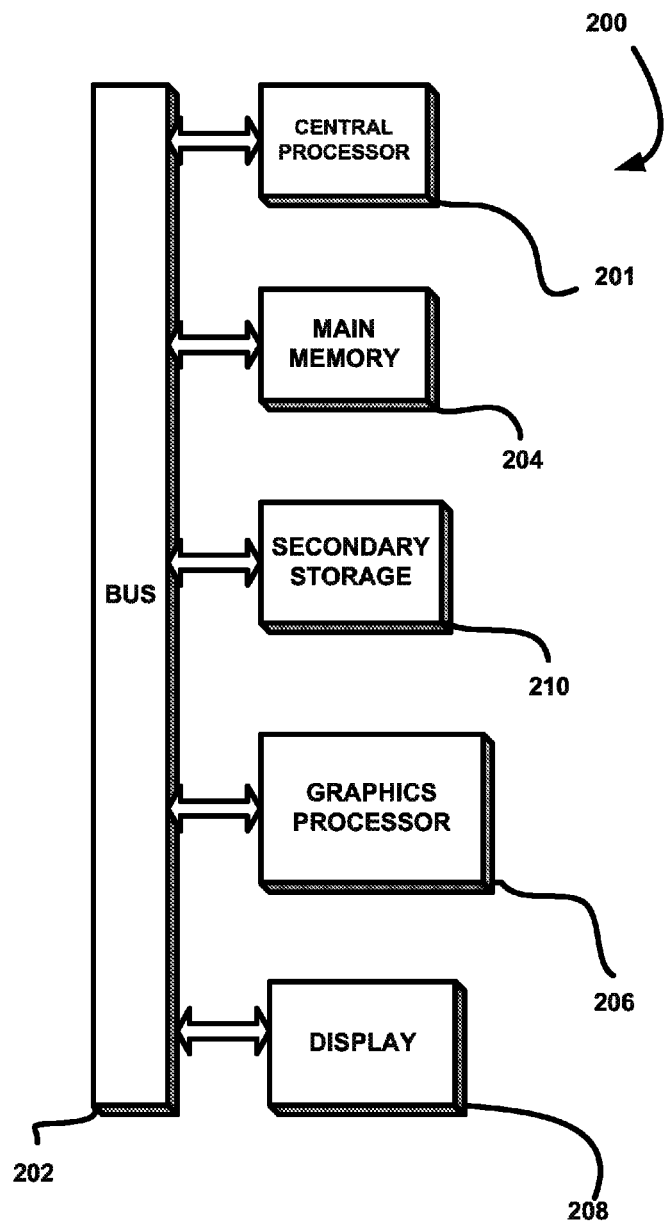
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc.

The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
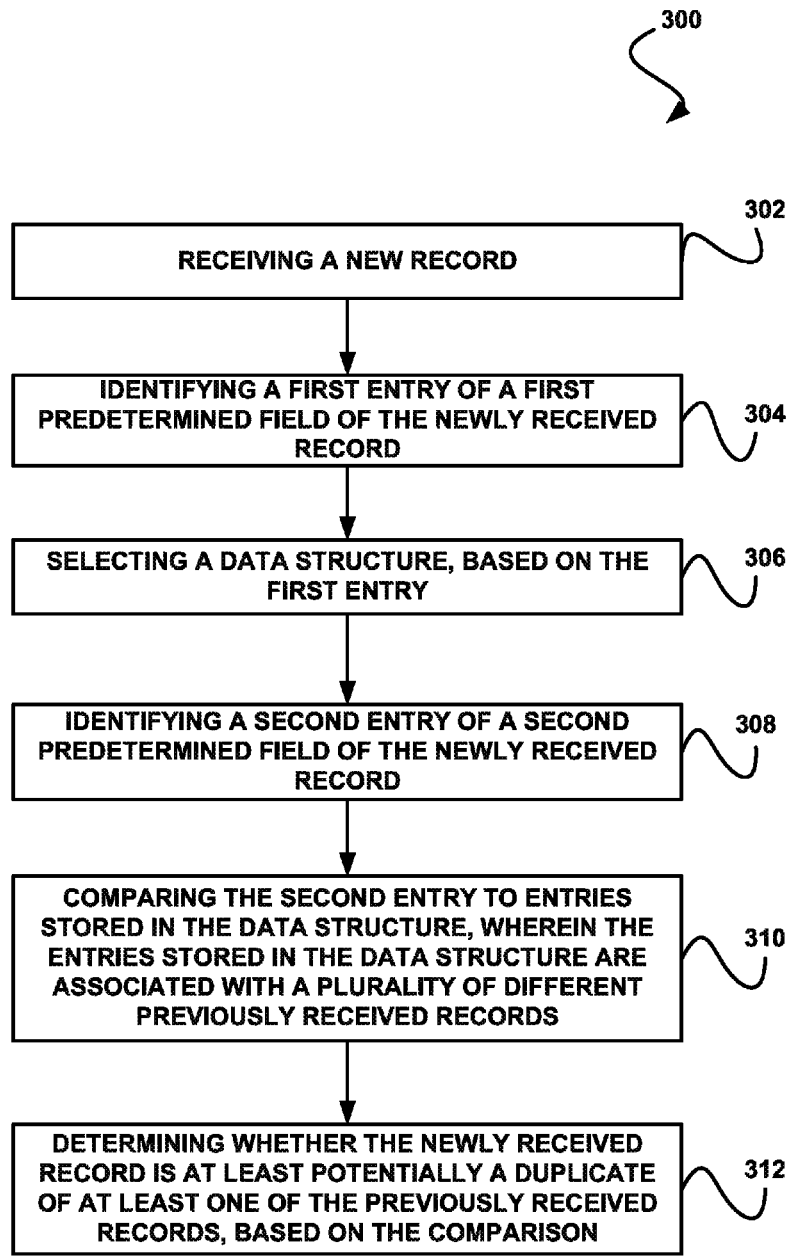
FIG. 3 illustrates a method for determining at least potentially duplicate records, in accordance with one embodiment.

FIG. 3 illustrates a method 300 for determining at least potentially duplicate records, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a new record is received. In the context of the present description, the newly received record includes any data structure storing data in a plurality of fields. For example, the record may include a database record, namely a row of data in a database where each column of the row is a separate field for storing data.

In one embodiment, the newly received record may be received for storage of the newly received record (e.g. in a database). Thus, the newly received record may be received in association with an instruction to write the newly received record to a particular portion of memory (e.g. the database). In another embodiment, the newly received record may be received as part of an incoming stream of records, such that the newly received record is received with a plurality of other records.

In yet another embodiment, the newly received record may be received by a first portion (e.g. application, etc.) of a system (e.g. computer, etc.) from a second portion of the system. In another optional embodiment, the newly received record may be received by a first system from a remote second system (e.g. via a network). Of course, it should be noted that the newly received record may be received in any desired manner, such as through files.

Additionally, as shown in operation 304, a first entry of a first predetermined field of the newly received record is identified. Such first predetermined field may include any field of the newly received record that has been pre-designated for identifying the first entry therein. As noted above, the first predetermined field may include a particular part of the newly received record, but of course in other embodiments may include any portion of the newly received record having an entry that is identifiable. As an option, the first entry of the first predetermined field may be stored in a way which utilizes less memory than its 'registered' full size.

In one embodiment, the first predetermined field of the newly received record may include a field utilized for storing a key of the record. For example, the newly received record may include one or more keys, each stored in a separate field, which are unique to the newly received record. Accordingly, the newly received record may be uniquely identified (e.g. from other records) utilizing the key(s).

In another embodiment, the first entry of the first predetermined field of the newly received record may include any data stored in the first predetermined field of the newly received record. For example, the first entry may include a value, a series of values, etc. In the embodiment described above where the first predetermined field of the newly received record is utilized for storing a key of the record, the first entry may include such key of the record.

In one exemplary embodiment, the first predetermined field of the newly received record may include a user field for storing an identifier of a user. Thus, with respect to such exemplary embodiment, the first entry of the first predetermined field of the newly received record may be such identifier of the user (e.g. a unique user number, etc.), such that the first entry may identify the user.

Still yet, a data structure is selected, based on the first entry, as shown in operation 306. With respect to the present description, the data structure includes any structure (e.g. table, buffer, etc.) for storing entries associated with a plurality of different previously received records. The different previously received records may include records received separate from the newly received record, records that are not the same instance (but may possibly be a duplicate) of the newly received record, etc. It should be noted that the aforementioned database may be separate from the data structure.

For example, the data structure may store only a subset of the entries (e.g. each included in a different field) of such previously received records that are separate from the newly received record (e.g. that are not the same instance of the newly received record received in operation 302). Just by way of example, the data structure may store only an entry of each of the previously received records which is included in a second predetermined field (separate from the first predetermined field) of the previously received records. More information regarding such second predetermined field is provided below. Of course, as another option, the data structure may store all entries of previously received records that are separate from the newly received record.

As an option, the entries stored in the data structure may be sorted within the data structure. For example, the entries may be stored in numerical, alphabetical, etc. order. As another option, the entries stored in the data structure may be calculated from a base entry configured for the data structure. Just by way of example, where the entries include timestamps (as described below), the entries may be calculated from a base time configured for the data structure.

Further, in one embodiment, the data structure may be selected from a plurality of data structures. As an option, each of the data structures may be specific to a different entry of the first predetermined field among the previously received records. Thus, the data structure that is determined to be specific to the first entry of the first predetermined field of the newly received record identified in operation 304 may be selected.

For example, for any given one of the data structures, only for records having the entry specific to such given data structure may other entries of such records be stored in the given data structure. As another example, the selected data structure may be specific to the first entry, such that only for records having the first entry may other entries be stored in the data structure. In one exemplary embodiment where the first entry is an identifier of a particular user, the data structure may only store entries of records that have as their first entry the identifier of the particular user.

Further, a second entry of a second predetermined field of the newly received record is identified, as shown in operation 308. Such second predetermined field may include any field of the record separate from the first predetermined field that has been pre-designated for identifying the second entry therein. Similar to that noted above, the second field may include a particular column of the newly received record, but of course in other embodiments may include any portion of the newly received record having an entry that is identifiable.

In one embodiment, the second predetermined field of the newly received record may include a field utilized for storing a key of the newly received record. As also noted above, the first predetermined field may similarly store a key of the newly received record, such that the first predetermined field and the second predetermined field may each include a respective entry, the combination of which uniquely identify the newly received record.

In another embodiment, the second entry of the second predetermined field of the newly received record may include any data stored in the second predetermined field of the newly received record. For example, the second entry may include a value, a series of values, etc. In the embodiment described above where the second predetermined field of the newly received record is utilized for storing a key of the record, the second entry may include such key of the newly received record.

In one exemplary embodiment, the second predetermined field of the newly received record may include a timestamp field for storing a timestamp associated with the newly received record. For example, the timestamp may include a time that the record was generated, received (e.g. for storage in the database), etc. Thus, with respect to such exemplary embodiment, the second entry of the second predetermined field of the newly received record may be such timestamp, for optionally being utilized such that the record can be sorted, allowing also highest/lowest/latest and relevant ones to be stored in computer memory.

Moreover, the second entry is compared to entries stored in the data structure, where, as noted above, the entries stored in the data structure are associated with the plurality of different previously received records. Note operation 310. As described above, the data structure may store all of the entries of each of the previously received records, or optionally only a subset of the entries of each of the previously received records. Thus, the second entry of the second predetermined field of the newly received record may be compared, via the data structure, to the aforementioned subset of the entries of each of the previously received records, in one embodiment.

For example, the entries stored in the data structure to which the second entry is compared may include entries of the second predetermined field of the previously received records. In such example, the subset of the entries of each of the previously received records stored in the data structure may optionally only include the entries of the second predetermined field of the previously received records. In one exemplary embodiment, where the second predetermined field includes the timestamp field, a timestamp stored in the newly received record may be compared to timestamps stored in the data structure for each of the previously received records.

In one embodiment, each of the entries stored in the data structure may include an array of values. For example, such entries may each include a plurality of bits (e.g. 16 bits, etc.). In another embodiment, each entry may include a first portion and a second portion, where the first portion indicates at least one type of data stored in the second portion.

Accordingly, and strictly as an option, the second entry may be compared to the entries stored in the data structure by first comparing a portion of data of a first type stored in the second entry to at least a first portion of each of the entries, and in response to identifying a match based on the first comparison, subsequently comparing a portion of data of a second type stored in the second entry to at least a second portion of each of the entries. In one embodiment, the first portion of the entries may be of the first type and the second portion of the entries may be of the second type. Thus, by way of example where the second entry includes a timestamp with a day portion and a time portion, the second entry may be compared to the entries stored in the data structure by first comparing the day portion of the second entry with the day portion of each of the entries in the data structure, and only in response to identifying a match based on the first comparison, the time portion of the second entry may be compared to the time portion of each of the entries in the data structure.

In addition, it is determined whether the newly received record is at least potentially a duplicate of at least one of the previously received records, based on the comparison. Note operation 312. In the present description, the newly received record may be a duplicate of one of the previously received records if there is an exact match between all field entries of the newly received record and the previously received record. Accordingly, the newly received record may be a potential duplicate of one of the previously received records if there is an exact match between a subset of all field entries of the newly received record and the previously received record.

In one embodiment, it may be determined that the newly received record is at least potentially the duplicate of one of the previously received records in response to a determination that the second entry of second predetermined field the newly received record matches one of the entries stored in the data structure. For example, by virtue of the selection of the data structure based on the first entry, the previously received records having an entry matching such first entry may be identified (due to their inclusion in the data structure). Further, from such identified previously received records, those previously received records also having an entry matching the second entry may be identified (from the comparison in operation 310).

Thus, the newly received record may be identified as a potential duplicate of another record with an entry matching the first entry of the first predetermined field of the newly received record and with an entry matching the second entry of the second predetermined field of the previously received record. By identifying potentially the newly received record as a duplicate of a record stored in a database using only a subset of entries of the records (e.g. the first entry and the second entry), a query to the database to determine only whether such potential duplicates are actual duplicates may be provided. In this way, such determination may be avoided for records that are not potential duplicates.

Furthermore, the present method 300 may allow a determination of whether a record to be stored in a database is a duplicate of another record already stored in the database, using a minimal number of fields of such records. As noted above, this may further eliminate, in a significant number of the records, a need to check against the database during processing (e.g. when determining whether to store such records in the database). In addition, by using the combination of the first entry and the second entry to identify potential duplicates, a number of steps in memory to determine whether the newly received record is a duplicate of another record may be reduced. Further, memory requirements may be reduced by avoiding use of pointers. To this end, data may be stored in a data structure which is both economical and fault-tolerant, making sure that interrupted execution of the program does not invalidate the data structure.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
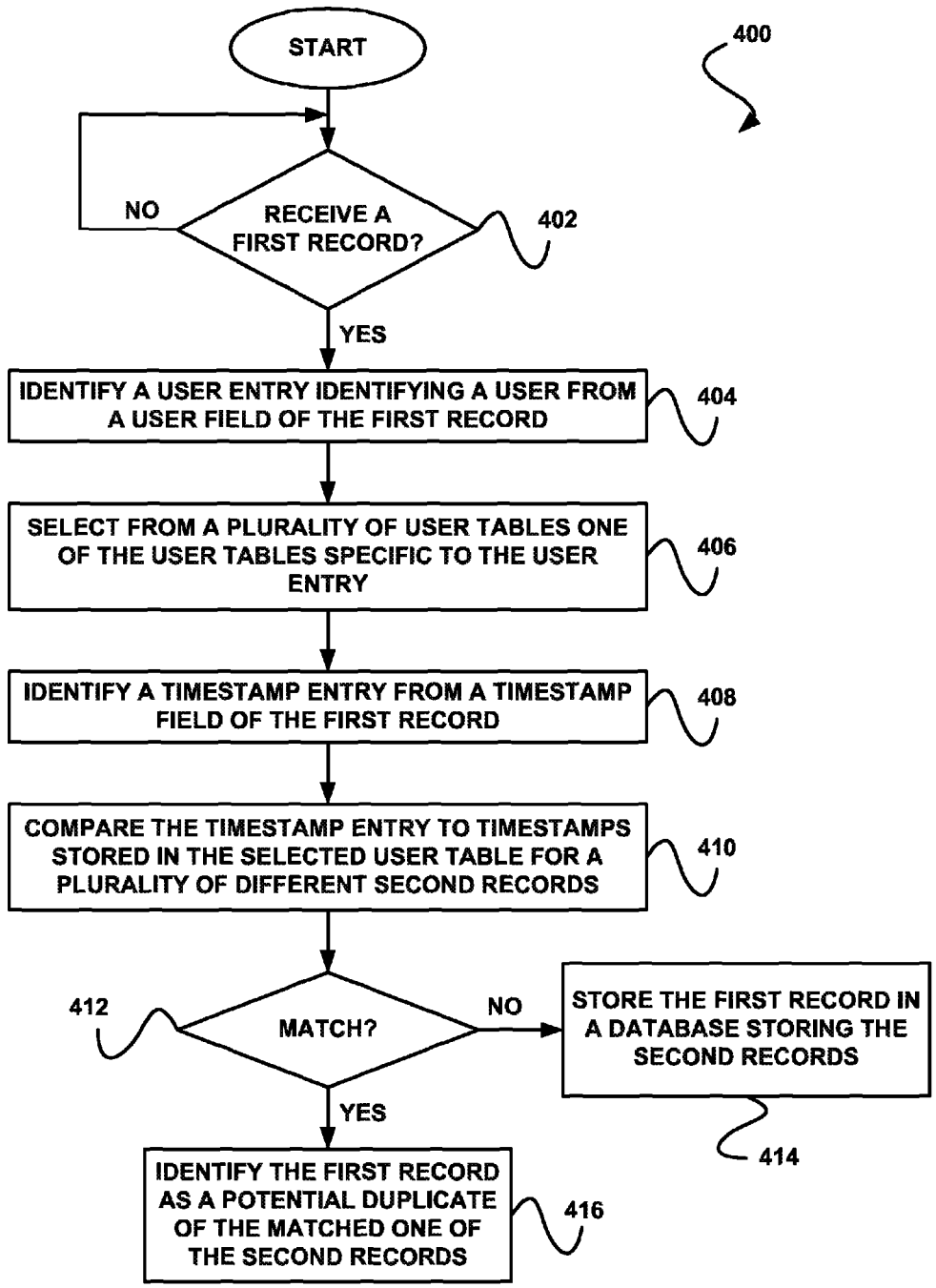
FIG. 4 illustrates a method for determining at least potentially duplicate records utilizing a user entry and timestamp entry of the records, in accordance with another embodiment.

FIG. 4 illustrates a method 400 for determining at least potentially duplicate records utilizing a user entry and timestamp entry of the records, in accordance with another embodiment. As an option, the method 400 may be carried out in the context of the details of FIGS. 1-3. Of course, however, the method 400 may be carried out in any desired environment. Further, the aforementioned definitions may equally apply to the description below.

As shown in decision 402, it is determined whether a first record is received. For example, it may be determined whether a request to store a record in a database of records has been received. If it is determined that the first record has not been received, the method 400 continues to wait for such a first record to be received.

However, in response to a determination that the first record has been received, a user entry identifying a user is identified from a user field of the first record. Note operation 404. For example, an entry may be extracted from the user field of the first record, for identifying the value of such entry.

Additionally, one of a plurality of user tables is selected that is specific to the user entry, as shown in operation 406. Each of the user tables may store record entries only for records with a respective user entry. Thus, each of the user tables may be specific to a particular user entry. In the present embodiment, the selected user table may store record entries only for records with the user entry identified in operation 404.

In one embodiment, the user tables may be compact and use only 16 bits of memory per entry stored therein. Each user table may store a base entry of 64 bits that serves as the first entry stored in the user table. All other table entries may be offset from the base entry. Thus, for example, where a user table stores timestamps (as described below), the user table may include as its first entry a base timestamp, and timestamps from other records stored in the user table may be calculated from such base timestamp, whereby such calculated timestamps are stored in the user table.

The size of the user tables may be a function of a time span (e.g. frame) for which timestamps included in such time span are stored in the user tables, and further a resolution (e.g. 1 second, etc.) at which the timestamps offset from the base timestamp. For example, the time span may be limited to approximately 18 hours. Using such a limited time span may reduce latency when processing received records for determining whether such received records are potential duplicates.

Also, all operations on the user tables may optionally be atomic. Thus, after a failure, there may be no need for recovery. In addition, two way commits between the user tables and the database may be avoided, since there may not necessarily be any harm if a timestamp of a record is inserted to the user tables and the record itself does not succeed to enter the database.

In one embodiment, the user tables may each include an array of 16 bit entries, each 16 bit entry representative of a timestamp of a record in the present embodiment. A first portion of each entry may define a type of a second portion of each entry. Table 1 illustrates one example of the structure of an entry in a user table. It should be noted that such entry is set forth for illustrative purposes only, and thus should not be construed as limiting in any manner.

TABLE 1

| K | K | V | V | V | V | V | V | V | V | V | V | V | V | V | V |
| --- | --- | --- | --- | --- | --- | --- | --- | --- | --- | --- | --- | --- | --- | --- | --- |

In Table 1, the K bits define a type of the value stored by the V bits. Thus, there may be $2^K$ possible types that may be defined in an entry. In the example shown in Table 1 where K=2, the 2 K bits for a particular entry may define one of 4 available types, and the remaining 14 bits may define a value of the type defined by the 2 K bits. This structure may allow for 16384 different values that may be stored in the V bits. Of course, as another example, where K=1, there may be two types of values that may be stored in an entry (See the data structure 600 of FIG. 6 for example).

Another use for the structure shown in Table 1 is flattening a hierarchal structure, where each node contains one or more entries. FIG. 7 illustrates one example of utilizing the structure of Table 1 to define a hierarchical entry in a flattened hierarchical data structure 700.

As noted above, where K=1, there may be two types of values that may be stored in an entry. The first type may include a 15 bit pseudo-day entry (PD), where each $PD=2^{15}$ seconds. The second type may include a 15 bit time entry (e.g. a time within the PD). A type of a particular entry may be distinguished by the most significant bit in the 16 bit entry.

As described above, the user tables may each include an array of 16 bit entries. The array may be a sorted list of timestamps, where each timestamp is specified by a 16 bit entry (e.g. utilizing the structure described in Table 1). In addition, the array may store a newest PD and oldest PD. In a further embodiment, a single 64 bit base timestamp (described above) may be stored in the array. Optionally, the base timestamp may be set to a startup time of a system on which the associated user table is stored.

Table 2 shows one example of an algorithm for generating a timestamp entry for a record that is to be stored in the selected user table as an offset of a base timestamp. Of course, it should be noted that the algorithm shown in Table 2 is set forth for illustrative purposes only, and thus should not be construed as limiting in any manner.

TABLE 2

| | |
| --- | --- |
| 1) | Identify the base timestamp from the data structure |
| 2) | Add a pseudo-day |
| 3) | Add timestamp identified from the record |

Table 3 shows an exemplary implementation of the algorithm of Table 2. Again, the example shown in Table 3 is set forth for illustrative purposes only, and thus should not be construed as limiting in any manner.

TABLE 3

Base timestamp = 1/1/2010, 12:00
Pseudo-day = 1
Timestamp identified from the record = 300
Timestamp entry to be stored in the data structure for the record is calculated as:
$1/1/2010, 00:00 + 1 * 2^{15} + 300 = 1/1/2010, 09:11:08$ Optionally, if a size of the array exceeds a known size, past entries in the array may be omitted or the array may be enlarged by copying entries stored therein to a new and larger array that replaces the original array. As another option, if an oldest entry exceeds a required time to memorize, a size of the array may be reduced by copying entries in the array to a new and smaller array that replaces the original array. Thus, the array may be enlarged or reduced according to known criteria (e.g. a size of a history of the entries stored in the array or a size of the array).

Further, as shown in operation 408, a timestamp entry is identified from a timestamp field of the first record. For example, an entry may be extracted from the timestamp field of the first record, for identifying the value of such entry. The timestamp entry may be a timestamp for the first record.

The timestamp entry is then compared to timestamps stored in the selected user table for a plurality of different second records, as shown in operation 410. As noted above, the selected user table may store entries for other records (i.e. the second records) which also store the user entry identified in operation 404. For example, the selected user table may store timestamp entries of the second records which also store the user entry. Optionally, the selected user table may sort the timestamps stored therein, for storing the timestamps in order (e.g. from earliest time to latest time, etc.).

Moreover, based on the comparison, it is determined whether there is a match between the timestamp entry and the timestamps stored in the selected user table. Note decision 412. If it is determined that there is not a match between the timestamp entry and the timestamps stored in the selected user table, the first record is stored in a database storing the second records 414. It should be noted that such database may be separate from the selected user table.

For example, a determination that there is not a match between the timestamp entry and the timestamps stored in the selected user table may indicate that the first record is not a duplicate of any of the second records for which their timestamp entries are stored in the selected user table. As an option, the timestamp entry may be added to the selected user table, based on the determination. In one embodiment, the timestamp entry may be added to the selected user table in response to the determination that there is not match between the timestamp entry and the timestamps stored in the selected user table (e.g. since such timestamp does not already exist in the selected user table).

Table 4 illustrates an algorithm for adding the timestamp entry to the selected user table. It should be noted that the algorithm shown in Table 4 is set forth for illustrative purposes only, and thus should not be construed as limiting in any manner.

TABLE 4

//Start with 64bit timestamp identified from the record, denoted as T
1. Subtract base time from T.
2. IF T is older than the oldest time stored, do not add the value to the array.
3. If T is the newest, swap between the newest time and T
4. PD ← 15bit most significant bits of T
5. TTIME ← 15bit least significant bits of T
6. Search for PD in array
   6.1. If PD found, search for TTIME entry starting at PD
   6.2. If not found:
      create empty space at the right position.
      Add a TTIME as a new Time entry after PD
      6.2.1. If found, return
   6.3. If PD not found, add a PD as new pseudo-day
      6.4. Create empty space at the right position.
         Add TDD as a new pseudo-day.
      6.5. create empty space at the right position.
         Add a TTIME as a new Time entry after PD As an option, empty space within the selected user table may also be created. Table 5 illustrates an algorithm for creating empty space within the selected user table. It should be noted that the algorithm shown in Table 5 is set forth for illustrative purposes only, and thus should not be construed as limiting in any manner.

TABLE 5

//Start with 16bit index as IDX parameter
Copy data from [IDX... LENGTH] to [IDX+1...LENGTH]

If, however, it is determined that there is a match between the timestamp entry and the timestamps stored in the selected user table, the first record is identified as a potential duplicate of the matched one of the second records. Note operation 416. Specifically, the first record may be identified as a potential duplicate of the one of the second records having the timestamp that matches the timestamp entry of the first record. As another option, in response to the identification of the first record as the potential duplicate, the timestamp entry of the first record may be avoided from being stored in the selected user table (e.g. since the selected user table already has stored therein the same timestamp).

As another option (not shown), the first record may also be identified as a potential duplicate of one of the second records stored in the database if the timestamp entry is earlier than the base timestamp configured for the selected user table. For example, as noted above, the selected user table may only store timestamps which are offset from the base timestamp, such that the selected user table may not necessarily store timestamps of records which are earlier than the base timestamp. Thus, if the timestamp entry for the first record is earlier than the base time stored as the first entry in the selected user table, it may be determined that the first record is potentially a duplicate of records for which their timestamps are not stored in the selected user table.

Table 6 illustrates an algorithm for determining whether a potentially duplicate record is identified by searching a data structure specific to a first entry of a first predetermined field of a record for a timestamp of the record. It should be noted that the algorithm shown in Table 6 is set forth for illustrative purposes only, and thus should not be construed as limiting in any manner.

TABLE 6

//Start with 64bit timestamp identified from the record, denoted as T
1. Subtract base time from T.
2. Enter 15bit most significant bits of T into Pseudo-day (PD) variable
3. Enter 15bit least significant bits of T into T-TIME variable
4. IF T is older than the oldest time stored, do not add the value to the array.
5. If T is newer than the 'newest' value stored, swap between the newest time and T
6. Search for Pseudo-day in the array of record stamps stop when the value in the array is equal to or lower than PD variable.
7. If PD = value in the array, search for TTIME starting at the next cell in the array, until a pseudo-day value lower than PD found.
8. If TTIME is lower than value in the array, stop search and return 'not-found'
9. If TTIME equal to the value in the array - return 'Found' (resort to second level checking)

Figure 5:
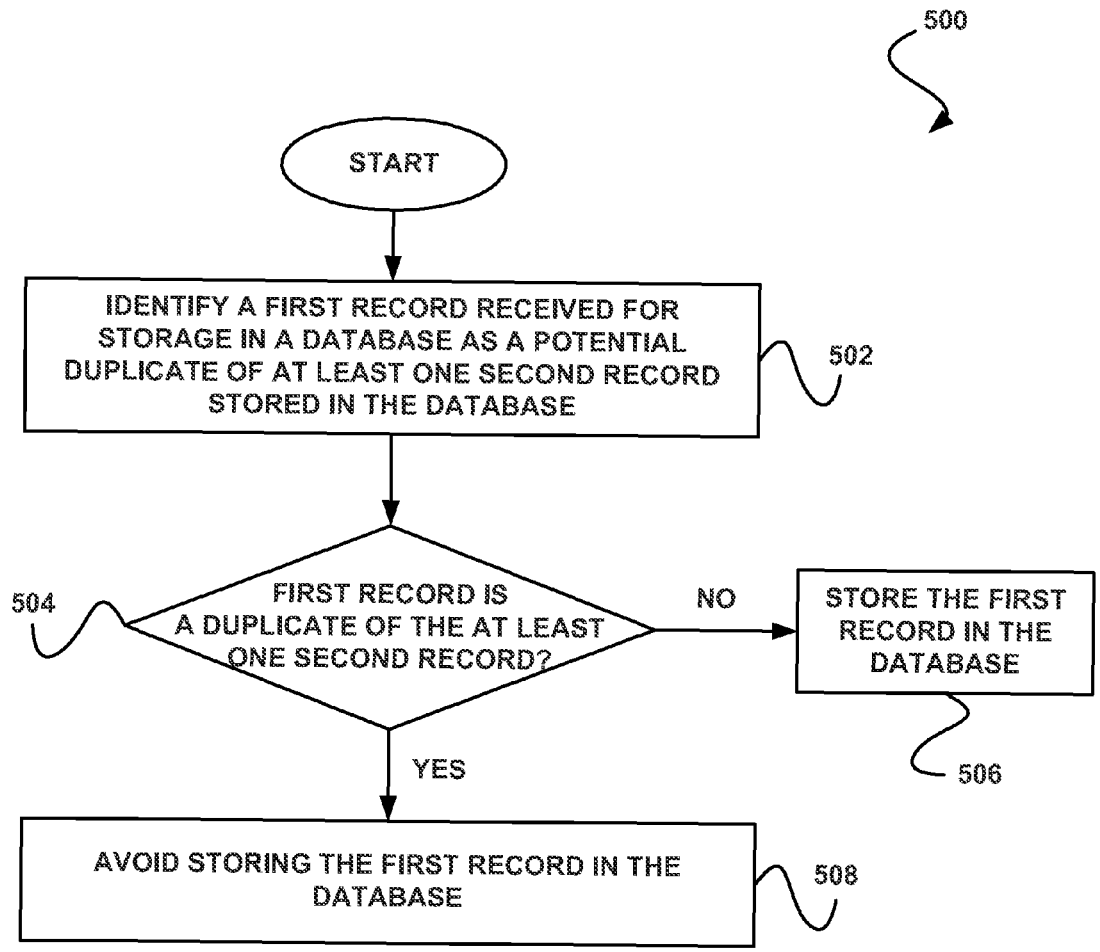
FIG. 5 illustrates a method for conditionally storing a record in a database based on a determination of whether the record is a duplicate of another record, in accordance with yet another embodiment.

FIG. 5 illustrates a method 500 for conditionally storing a record in a database based on a determination of whether the record is a duplicate of another record, in accordance with yet another embodiment. As an option, the method 500 may be carried out in the context of the details of FIGS. 1-4. For example, the method 500 may be carried out in response to operation 416 of FIG. 4. Of course, however, the method 500 may be carried out in any desired environment. Further, the aforementioned definitions may equally apply to the description below.

As shown in operation 502, a first record received for storage in a database is identified as a potential duplicate of at least one second record stored in the database. For example, the first record may be identified as the potential duplicate utilizing the method 400 described above in FIG. 4.

Further, as shown in decision 504, it is determined whether the first record is a duplicate of the second record. In particular, it may be determined whether the first record identified as a potential duplicate of the second record is in fact a duplicate of the second record.

In one embodiment, the determination may be made by performing a database operation on the database storing the second record. Optionally, such database operation may include instructing an insert of the first record into the database. A result of such instruction may indicate whether the first record is already stored in the database (e.g. and thus whether the first record is a duplicate of the second record).

In another embodiment, the determination may be made by comparing all entries of the first record to all entries of the second record. If an exact match between the entries of the first record and the entries of the second record is identified, then the first record may be determined to be a duplicate of the second record. Of course, however, it may be determined whether the first record is a duplicate of the second record in any desired manner.

Still yet, in response to a determination that the first record is not a duplicate of the second record, the first record is stored in the database. Note operation 506. In one embodiment, the first record may be written to the database. To this end, non-duplicate records may be stored in the database.

However, in response to a determination that the first record is a duplicate of the second record, storage of the first record in the database is avoided. Note operation 508. For example, the first record may be prevented from being stored in the database, such that storage of duplicate records in the database or a rewriting of the duplicate record into the database may be avoided.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
    computer code for receiving a new record, the newly received record storing data in a plurality of fields;
    computer code for identifying a user identifier of a first predetermined field of the newly received record;
    computer code for selecting a data structure based on the user identifier of the first predetermined field, the data structure specific to the user identifier such that a separate entry is created in the data structure only for each received record containing the user identifier, wherein the entry in the data structure for each received record containing the user identifier stores only a timestamp of the received record;
    computer code for identifying a timestamp of a second predetermined field of the newly received record;
    computer code for comparing the timestamp of the second predetermined field of the newly received record to the entries stored in the data structure, including first comparing a portion of data of a first type stored in the timestamp indicating a date associated with the newly received record to at least a first portion of the entries, and in response to identifying a match based on the first comparison, subsequently comparing a portion of data of a second type stored in the timestamp indicating a time associated with the newly received record to at least a second portion of the entries, such that the portion of data of the second type stored in the timestamp is compared to at least a second portion of the entries only if a match is identified between the portion of data of the first type stored in the timestamp to at least the first portion of the entries;
    computer code for determining whether the newly received record is at least potentially a duplicate of at least one of the other received records, based on the comparison, where it is determined that the newly received record is at least potentially the duplicate of the at least one of the other received records in response to a determination that the timestamp matches one of the entries stored in the data structure;
    computer code for adding the timestamp of the second predetermined field of the newly received record to the data structure, in response to a determination that the newly received record is not potentially a duplicate of at least one of the other received records; and
    computer code for providing a query to a database for determining whether an actual duplicate of the newly received record exists, in response to a determination that the newly received record is at least potentially a duplicate of at least one of the other received records;
    wherein the data structure is selected from a plurality of data structures, each of the data structures specific to a different user identifier.

2. The computer program of claim 1, wherein the newly received record is received for storage in a database.

3. The computer program of claim 2, wherein the database for storing the newly received record is separate from the data structure selected based on the user identifier of the first predetermined field.

4. The computer program of claim 1, wherein each of the entries stored in the data structure are of 16 bits.

5. The computer program of claim 1, wherein each of the entries stored in the data structure includes an array.

6. The computer program of claim 5, wherein the array includes the first portion and the second portion, the first portion of the array indicating at least one type of data stored in the second portion of the array.

7. The computer program of claim 1, wherein the entries stored in the data structure are sorted within the data structure.

8. The computer program of claim 1, wherein the entries stored in the data structure are calculated from a base entry configured for the data structure.

9. The computer program of claim 1, wherein the first portion of the entries is of the first type and the second portion of the entries is of the second type.

10. A method, comprising:
    receiving a new record, the newly received record storing data in a plurality of fields;
    identifying a user identifier of a first predetermined field of the newly received record;
    selecting a data structure based on the user identifier of the first predetermined field, the data structure specific to the user identifier such that a separate entry is created in the data structure only for each received record containing the user identifier, wherein the entry in the data structure for each received record containing the user identifier stores only a timestamp of the received record;
    identifying a timestamp of a second predetermined field of the newly received record;
    comparing the timestamp of the second predetermined field of the newly received record to the entries stored in the data structure, including first comparing a portion of data of a first type stored in the timestamp indicating a date associated with the newly received record to at least a first portion of the entries, and in response to identifying a match based on the first comparison, subsequently comparing a portion of data of a second type stored in the timestamp indicating a time associated with the newly received record to at least a second portion of the entries, such that the portion of data of the second type stored in the timestamp is compared to at least a second portion of the entries only if a match is identified between the portion of data of the first type stored in the timestamp to at least the first portion of the entries;

determining whether the newly received record is at least potentially a duplicate of at least one of the other received records, based on the comparison, where it is determined that the newly received record is at least potentially the duplicate of the at least one of the other received records in response to a determination that the timestamp matches one of the entries stored in the data structure;

adding the timestamp of the second predetermined field of the newly received record to the data structure, in response to a determination that the newly received record is not potentially a duplicate of at least one of the other received records; and providing a query to a database for determining whether an actual duplicate of the newly received record exists, response to a determination that the newt received record is at least potentially a duplicate of at least one of the other received records;

wherein the data structure is selected from a plurality of data structures, each of the data structures specific to a different user identifier.

11. A system, comprising:

a memory; and a processor coupled to the memory via a bus for:

receiving a new record, the newly received record storing data in a plurality of fields;

identifying a user identifier of a first predetermined field of the newly received record;

selecting a data structure based on the user identifier of the first predetermined field, the data structure specific to the user identifier such that a separate entry is created in the data structure only for each received record containing the user identifier, wherein the entry in the data structure for each received record containing the user identifier stores only a timestamp of the received record;

identifying a timestamp of a second predetermined field of the newly received record;

comparing the timestamp of the second predetermined field of the newly received record to the entries stored in the data structure, including first comparing a portion of data of a first type stored in the timestamp indicating a date associated with the newly received record to at least a first portion of the entries, and in response to identifying a match based on the first comparison, subsequently comparing a portion of data of a second type stored in the timestamp indicating a time associated with the newly received record to at least a second portion of the entries, such that the portion of data of the second type stored in the timestamp is compared to at least a second portion of the entries only if a match is identified between the portion of data of the first type stored in the timestamp to at least the first portion of the entries;

determining whether the newly received record is at least potentially a duplicate of at least one of the other received records, based on the comparison, where it is determined that the newly received record is at least potentially the duplicate of the at least one of the other received records in response to a determination that the timestamp matches one of the entries stored in the data structure;

adding the timestamp of the second predetermined field of the newly received record to the data structure, in response to a determination that the newly received record is not potentially a duplicate of at least one of the other received records; and providing a query to a database for determining whether an actual duplicate of the newly received record exists, in response to a determination that the newly received record is at least potentially a duplicate of at least one of the other received records;

wherein the data structure is selected from a plurality of data structures, each of the data structures specific to a different user identifier.

12. The computer program of claim 1, wherein the timestamp of the newly received record indicates a time that the newly received record was generated.

13. The computer program of claim 1, wherein the timestamp of the newly received record indicates a time that the newly received record was received.

14. The computer program of claim 1, wherein adding the timestamp of the second predetermined field of the newly received record to the data structure includes creating an empty space in the data structure, adding the portions of data of the first and second type stored in the timestamp to the empty space.

* * * * *